United States Patent
Mcquillen et al.

(10) Patent No.: US 10,408,921 B2
(45) Date of Patent: Sep. 10, 2019

(54) VEHICLE DETECTION OF EXTERNAL OBJECTS

(71) Applicant: Ford Global Technologies, LLC, Dearborn, MI (US)

(72) Inventors: Michael Mcquillen, Warren, MI (US); Daniel A. Makled, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 322 days.

(21) Appl. No.: 15/336,969

(22) Filed: Oct. 28, 2016

(65) Prior Publication Data
US 2018/0120415 A1 May 3, 2018

(51) Int. Cl.
*G01S 7/40* (2006.01)
*B60W 30/09* (2012.01)
*G01S 13/93* (2006.01)
*G05D 1/02* (2006.01)
*G01S 13/86* (2006.01)

(52) U.S. Cl.
CPC .......... *G01S 7/4026* (2013.01); *B60W 30/09* (2013.01); *G01S 13/931* (2013.01); *G05D 1/0257* (2013.01); *G01S 13/867* (2013.01); *G01S 2013/9353* (2013.01); *G01S 2013/9389* (2013.01)

(58) Field of Classification Search
CPC .............................. G01S 7/4026; B60W 30/09
USPC ...................................................... 342/70–72
See application file for complete search history.

(56) References Cited

U.S. PATENT DOCUMENTS

| | | | |
|---|---|---|---|
| 5,959,570 A * | 9/1999 | Russell | G01S 13/003 342/70 |
| 6,278,399 B1 | 8/2001 | Ashihara | |
| 6,469,659 B1 * | 10/2002 | Lajiness | G01S 7/4004 342/159 |
| 6,611,227 B1 * | 8/2003 | Nebiyeloul-Kifle | G01S 7/4004 180/167 |
| 9,218,698 B2 | 12/2015 | Ricci | |

(Continued)

FOREIGN PATENT DOCUMENTS

DE 10347098 A1 5/2005
EP 1980874 A2 10/2008
(Continued)

OTHER PUBLICATIONS

Remcom, "EM Simulation of Automotive Radar Mounted in Vehicle Bumper," [Online]. Available: http://www.ar-europe.ie/downloads/articles/Remcom_EMSimulation_Automotive_Radar_inVehicle_Bumper.pdf (downloaded Oct. 24, 2016), 6 pages.

*Primary Examiner* — Marcus E Windrich
(74) *Attorney, Agent, or Firm* — Frank A. MacKenzie; Bejin Bieneman PLC (57) ABSTRACT

A vehicle computer is programmed to receive reflections of radio-magnetic beams transmitted by an antenna mounted to a vehicle body, and, when it is determined that the vehicle is moving, determine whether the vehicle body has changed shape based on the received reflections and a predetermined base reflection pattern. The computer is further programmed to generate a second base reflection pattern based at least on the received reflections and the predetermined base reflection pattern. The computer can then use the received reflections as vehicle sensor data.

19 Claims, 10 Drawing Sheets

(56) References Cited

U.S. PATENT DOCUMENTS

| | | | |
|---|---|---|---|
| 2011/0006941 A1* | 1/2011 | Samukawa | G01S 13/345 |
| | | | 342/70 |
| 2012/0290169 A1 | 11/2012 | Zeng et al. | |
| 2016/0091599 A1* | 3/2016 | Jenkins | G01S 13/34 |
| | | | 342/165 |
| 2016/0252610 A1* | 9/2016 | Smith | G01S 13/931 |
| | | | 342/27 |
| 2016/0266241 A1* | 9/2016 | Yukumatsu | G01S 7/40 |
| 2016/0291132 A1* | 10/2016 | Goto | G01S 7/4026 |
| 2016/0320471 A1* | 11/2016 | Preussner | G01S 13/60 |
| 2016/0334505 A1* | 11/2016 | Naruse | G01S 15/931 |
| 2017/0059695 A1* | 3/2017 | Fetterman | G01S 7/4026 |

FOREIGN PATENT DOCUMENTS

| | | | |
|---|---|---|---|
| JP | 2006017622 A | | 1/2006 |
| JP | 2006317162 A | * | 11/2006 |
| JP | 2006317162 A | | 11/2006 |
| JP | 2011196938 A | | 10/2011 |
| KR | 100765889 B1 | | 10/2007 |

* cited by examiner

VEHICLE DETECTION OF EXTERNAL OBJECTS

BACKGROUND

A vehicle may include one or more radar sensors to detect objects, e.g., in an area outside the vehicle. A radar sensor for detecting objects outside a vehicle may be mounted to the vehicle body, e.g., between a bumper and a vehicle body. The radar sensor is typically calibrated to account for a shape of the bumper and/or the vehicle body. However, the vehicle bumper and/or body can become deformed, e.g., due to an impact or collision. For example, dents or the like in the bumper, can cause the radar sensor to report data that is interpreted to indicate an object proximate to the vehicle, when in fact no such object is present. Further, even if a reported object is in fact present, where a bumper and/or vehicle body is deformed, radar can indicate a wrong location of the reported object.

DETAILED DESCRIPTION

Introduction

A vehicle 100 computer 110 can, via a radar sensor 130 including an antenna mounted to the vehicle 100 body 120, transmit radio-magnetic beams and receive reflections of the transmitted beams from objects such as other vehicles and/or parts of the vehicle 100 such as a vehicle 100 bumper 140. The computer 110 is further programmed to determine whether a part of the vehicle 100 body 120, e.g., the bumper 140, has changed shape based on the received reflections and a predetermined base reflection pattern, when it is determined that the vehicle 100 is moving. The computer 110 then generates a second base reflection pattern based at least on the received reflections and the predetermined base reflection pattern. The computer 110 can then use the received radio-magnetic beams as vehicle sensor data to control vehicle operation, e.g., for collision avoidance.

System Elements

Figure 1:
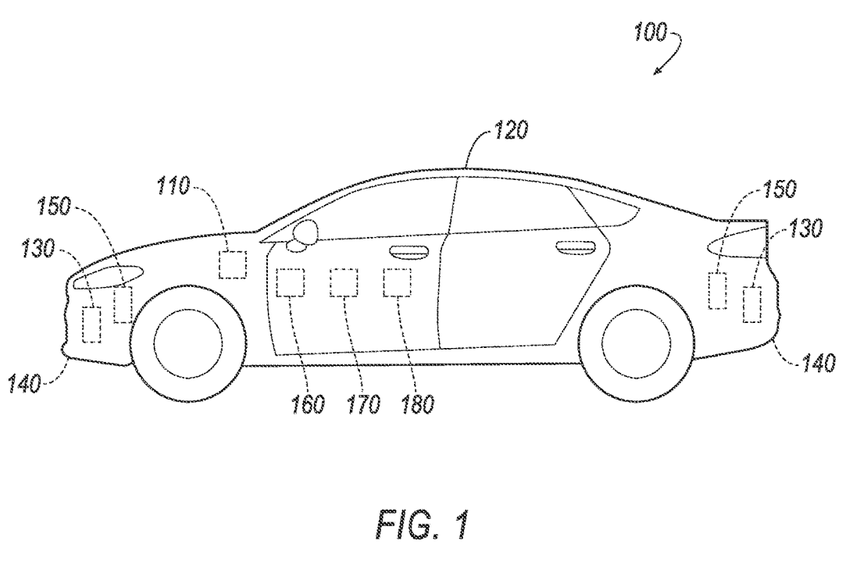
FIG. 1 is a diagram of an exemplary vehicle with a computer and radar sensors.

FIG. 1 illustrates a computer programmed to receive reflections of radio-magnetic beams transmitted by an antenna 150 of a radar sensor 130 mounted to a vehicle 100 body 120. The computer 110 is further programmed to determine whether the vehicle 100 body 120 has changed shape based on the received reflections and a predetermined base reflection pattern, when it is determined, based at least on a vehicle 100 speed, that the vehicle is moving. The computer 110 then generates a second base reflection pattern based at least on the received reflections and the predetermined base reflection pattern. The computer 110 can then use received radio-magnetic beams from vehicle 100 sensor 130 data for vehicle 100 operations, e.g., to actuate vehicle 100 components as part of a collision avoidance system.

The vehicle 100 may be powered in variety of known ways, e.g., with an electric motor and/or internal combustion engine. The vehicle 100 includes a body 120, a computer 110, one or more radar sensors 130, actuators, and other components discussed herein below.

The vehicle 100 body 120 may include a structure including various parts, e.g., roof, pillars, chassis, front end, rear end, etc., mechanically connected to one another by, e.g., welding, screws, etc. The vehicle 100 body 120 may include bumpers 140 such as a front bumper 140 and a rear bumper 140 mechanically coupled to the body 120 front and rear ends. The vehicle body 120 parts may be formed of metal such as steel and/or aluminum sheets, composite materials, plastic, etc. When a vehicle 100 impact occurs, the shape of vehicle 100 body 120 parts, e.g., a shape of a bumper 140, may change, i.e., experience deformation from a design shape. For example, the bumper 140 may dent-in (i.e., experience an inward-facing, or concave, dent, as shown in FIG. 2B), dent-out (i.e., experience an outward-facing, or convex, dent), or take an irregular shape, e.g., including dent-in and dent-out deformities, etc., due to an impact from a collision with an object, e.g., another vehicle, a garage door or pillar, etc. Additionally or alternatively, body 120 parts shape may gradually change due to other reasons such as deformation through aging of a plastic part.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering. As one example, the computer 110 may actuate the vehicle 100 brakes in response based on data from the radar sensor(s) 130 indicating an imminent crash with an object on the vehicle 100 driving path.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

Via the vehicle 100 network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors, e.g., the radar sensors 130, may provide data to the computer 110 via the vehicle communication network.

Controllers, as that term is used herein, are devices with memories and processors that typically are programmed to control a specific vehicle subsystem. Examples include a powertrain controller, a brake controller, and a steering controller. A controller may be an electronic control unit (ECU) such as is known, possibly including additional programming as described herein. The controllers may be communicatively connected to and receive instructions from the computer 110 to actuate subsystem vehicle component, e.g., braking, steering, powertrain, etc., according to the instructions. For example, the brake controller may receive instructions from the computer 110 to operate the brakes of the vehicle.

The actuators are implemented via circuits, chips, or other electronic components that can actuate various vehicle subsystems in accordance with appropriate control signals as is known. The actuators, therefore, may be used to control braking, acceleration, and steering of the host vehicle 100. Additionally, the actuators may control access to the vehicle 100, e.g., release/lock doors. The control signals used to control the actuators may be generated by the computer 110, a control unit located in the vehicle 100, e.g., the brake controller, etc.

The vehicle 100 may include various sensors to provide data via the vehicle communications bus. For example, the radar sensor(s) 130 may provide object detection, i.e., data including dimensions and/or relative location of objects outside the vehicle 100 within a field of view of the radar sensor(s) 130. The field of view refers to an area in which the radar sensor 130 can detect objects. The radar sensor(s) 130 transmit radio-magnetic beams, receive reflections of the transmitted beams, and measure a distance to an object reflecting the beams based at least on a time-to-travel, i.e., a time interval between transmission of a beam and receiving a reflection, i.e., an echo, of the same beam by the radar sensor 130. The radar sensor 130 may include one or more antennas 150, and electronic components such as chips, analog-to-digital converter 160, digital-to-analog converter 170, radio-magnetic amplifier 180, etc. The radar sensor 130 may include an array of antennas 150 oriented in various respective directions. The computer 110 can be programmed to detect objects based on received reflections of the transmitted beams.

Figure 2A:
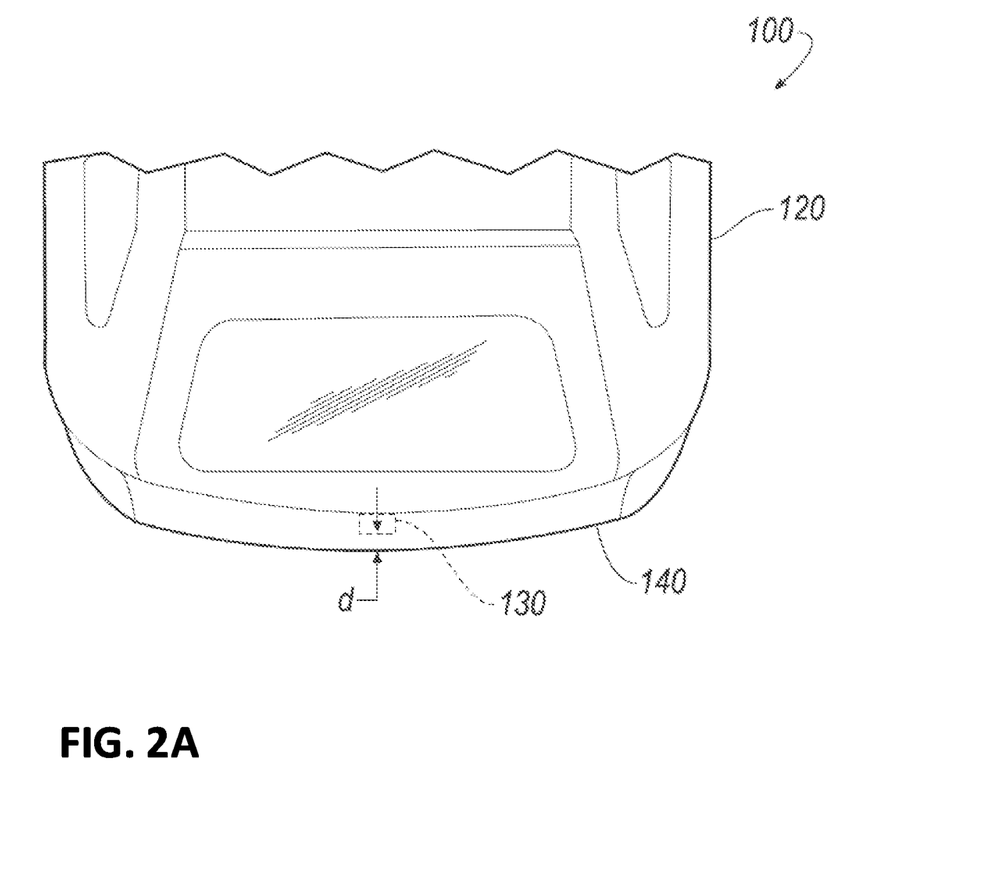
FIG. 2A is a top view of a portion of a vehicle body with a non-deformed bumper.
Figure 2B:
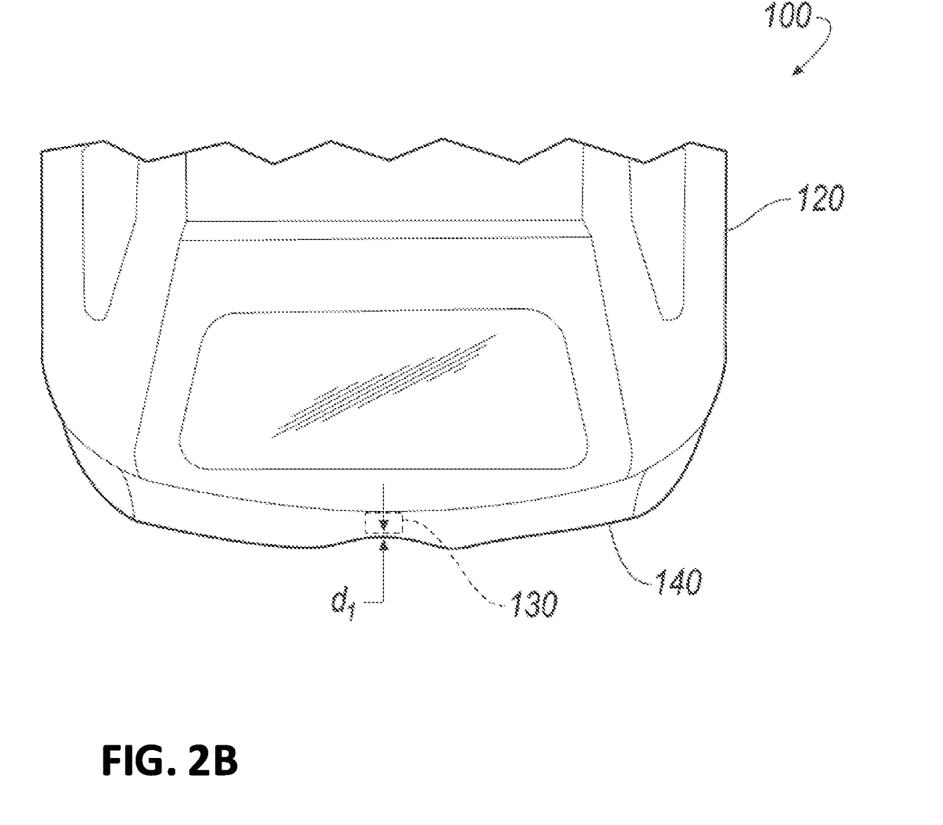
FIG. 2B is top view of the vehicle body of FIG. 2A with a deformed bumper.

For various reasons, e.g., to provide a pleasing appearance of the vehicle 100, the radar sensor(s) 130 may be mounted to the vehicle 100 body 120 so as to not be seen on the body 120 exterior surface, e.g., between the bumper 140 and the body 120 rear end, as shown in FIG. 2A. Thus, the radar sensor 130 antenna 150 may receive reflections from the bumper 140, which may lead to the computer 110 falsely detecting the bumper 140 as an object proximate to the vehicle 100. Such a detection is a false detection, because the bumper 140 is a part of the vehicle 100. In other words, the bumper 140 is an expected object in the radar sensor 130 field of view. Therefore, a detection of the vehicle 100 bumper 140 as an object external to and proximate to the vehicle 100 is a false detection.

To avoid a false detection, as one example, the computer 110 may be programmed to detect objects in a field of view of the radar sensor 130 based on received reflections, a detection of a body 120 part, e.g., the bumper 140, as an external and/or proximate object being prevented based at least on a predetermined base reflection pattern, sometimes referred to as the default base reflection pattern. The default base reflection pattern may include data indicating characteristics, e.g., time-to-travel, of reflections expected to be received from body 120 parts such as the bumper 140, the default base reflection pattern being adjusted as described herein to account for a deformation from a manufactured shape, i.e., a shape expected from a design of the bumper 140 or other body 120 part, to a deformed shape, as shown in FIG. 2B. A "time-to-travel" to an object refers to a time interval in which a transmitted beam travels from an antenna 150 to the object, the object reflects the beam, and a reflection of the transmitted beam is received by the antenna 150. Thus, a time-to-travel may depend on a distance between an antenna 150 and an object. Additionally or alternatively, the computer 110 may be programmed to detect the vehicle 100 body 120 parts based on a time-to-travel, e.g., all objects with a time-to-travel less than a predetermined time threshold may be considered as a part of the vehicle 100 body 120.

The default base reflection is defined based on factors that could include a shape of the bumper 140, a material of which the bumper is formed, a distance of the bumper 140 from the antenna 150, e.g., a distance d as shown in FIG. 2A, a shape of the antenna 150, and a frequency of transmitted radio-magnetic beams. For example, dependent on a direction of an antenna 150 relative to the bumper 140, a time-to-travel for reflections from the bumper 140 may be determined. As one example, the default base reflection may include data indicating reflections characteristics, e.g., time-to-travel, etc., from various points of on the bumper 140 in the radar sensor 130 field of view. In other words, the default base reflection pattern may include data indicating reflections from the bumper 140 in a three-dimensional coordinate system specifying expected reflections of body 120 parts in all directions within the field of view of the radar sensor 130.

As discussed above, a shape of body 10 parts such as the bumper 140 may change, e.g., experience deformation due to an impact to the vehicle 100 body 120. Reflections of the radar sensor 130 beams from a vehicle 100 body part with a changed shape may be different from the default base reflection pattern, i.e., body 120 parts with a changed shape may reflect radar sensor 130 beams differently compared to the body 120 part in a non-deformed condition, i.e., before experience a change in shape from a default, i.e., manufactured and/or designed, shape. This may lead to falsely detecting the body 120 part as an object external to the vehicle 100, rather than ignoring it as part of the vehicle 100 body 120.

FIG. 3-7 are exemplary graphs showing the respective times of transmitted and reflected radar sensor 130 beams, where the sensor 130 is located in a bumper 140. Pulses shown with dashed lines, e.g., at $t_1$, indicate a transmission of radiation beam. Pulses shown with continuous lines indicate a reception of a reflection of a transmitted beam. A height of a pulse shown in these graphs is an indication of transmission or reception only, and does not indicate an intensity of transmission or reception. The computer 110 is programmed to transmit the beams via the radar sensor 130 antenna 150 at times $t_1$, $t_2$, $t_3$, etc. For convenience, three transmissions and reflections are illustrated in the Figures. The computer 110 may be programmed to transmit periodically, e.g., with a constant time interval between two consecutive transmissions, and/or with a variable time difference between respective pairs of consecutive transmissions. A discussed above, a radar sensor 130 may include multiple antennas 150 oriented in various respective directions. For convenience, the graphs shown in Figures refer to distances measured in a direction of vehicle 100 longitudinal axis, but it is important to note that the explanations below apply to measurements in other directions too.

Figure 3:
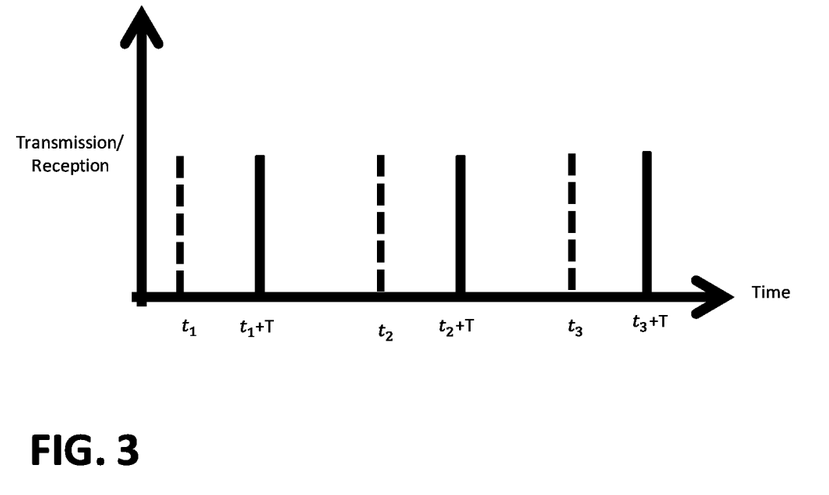
FIG. 3 is an exemplary graph of radar beam echoes from a non-deformed vehicle bumper.

FIG. 3 shows an exemplary graph including the respective times of transmitted and reflected radar sensor 130 beams, where the sensor 130 is in a non-deformed bumper 140, as shown in FIG. 2A. Based on the distance d of the bumper 140 from the vehicle 100 body 120, the reflections of the transmitted beams are received after a time-to-travel T, e.g., a reflection of a beam transmitted at time $t_1$, is received at time $t_r = t_1 + T$. The predetermined base reflection pattern may include the time of travel T. Thus, the computer 110 can be programmed to determine that the reflections received at times $t_1+T$, $t_2+T$, etc. occurred according to the default base reflection pattern and therefore prevent detecting the vehicle 100 bumper 140 as an object.

Figure 4:
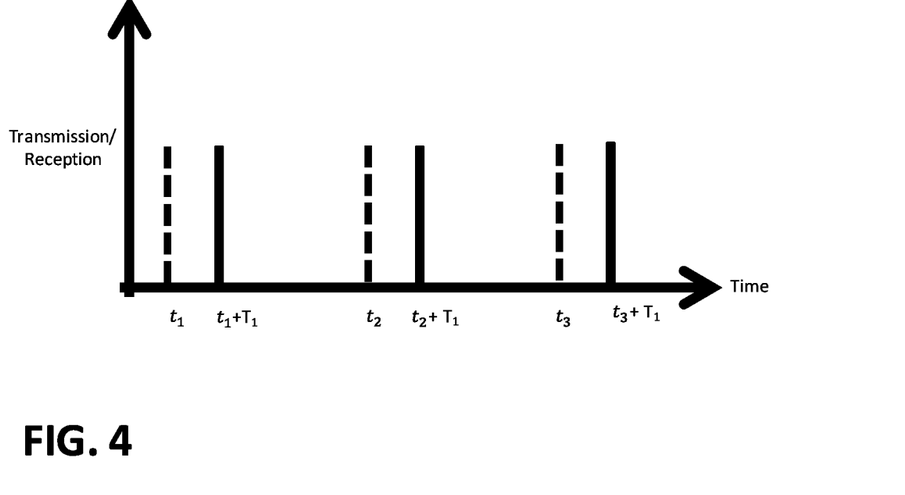
FIG. 4 is an exemplary graph of radar beam echoes from a dented-in bumper.

FIG. 4 is an exemplary graph showing the respective times of transmitted and reflected radar sensor 130 beams, where the radar sensor 130 is in a deformed bumper 140 that has a dent-in, as shown in FIG. 2B. Because the bumper is dented inward, a distance di between the bumper 140 and the vehicle 100 body 120 is less than the distance d of the non-deformed bumper 140 to the body 120. Accordingly, a time-to-travel $T_1$ for the transmitted beams may be less than a time-to-travel T for the beams reflected on the non-deformed bumper 140. Therefore, the reflections of the beams transmitted at $t_1$, $t_2$, $t_3$ may be received at $t_1+T_1$, $t_2+T_1$, $t_3+T_1$ respectively. The computer 110 may determine that the times $t_1+T_1$, $t_2+T_1$, etc. deviate from expected reception times $t_1+T$, $t_2+T$, etc., which are based on the default base reflection pattern. Thus, the computer 110 may falsely detect the dented-in bumper 140 of FIG. 2B as an object. To avoid such false detections, as discussed below, the computer 110 may be programmed to determine that the bumper 140 has changed shape, e.g., based on time-to-travel to a deformed bumper 140 which may differ from a time-to-travel to a non-deformed bumper 140, and accordingly generate a second base reflection pattern. Based on the second base reflection pattern, the computer 110 can then ignore the deformed bumper 140 rather than falsely detecting it as an object.

Figure 5:
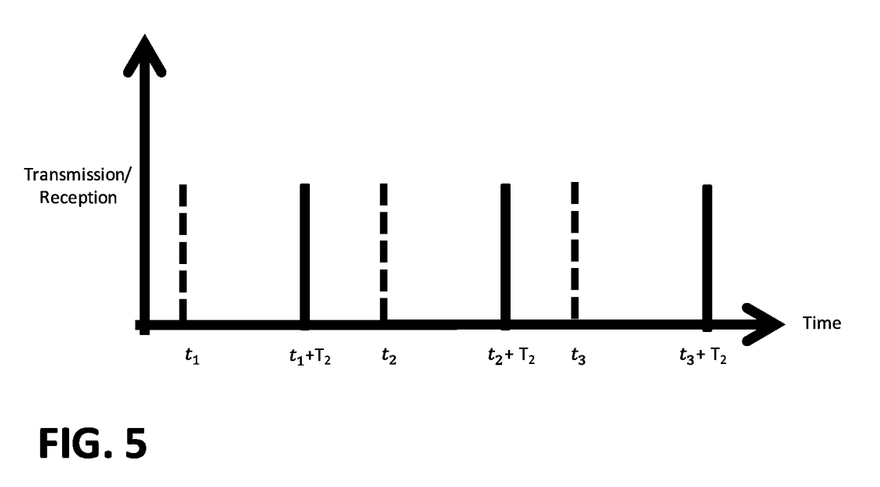
FIG. 5 is an exemplary graph of radar beam echoes from a dented-out bumper.

FIG. 5 is an exemplary graph showing the respective times of transmitted and reflected radar sensor 130 beams, where the radar sensor 130 is in a deformed bumper 140 that has a dent-out. Because the bumper is dented outward, a distance between the bumper 140 and the vehicle 100 body 120 is greater than the distance d of the non-deformed bumper 140 to the body 120. Accordingly, a time-to-travel $T_2$ for the transmitted beams may be greater than a time-to-travel T for the beams reflected on the non-deformed bumper 140. Therefore, the reflections of the beams transmitted at $t_1$, $t_2$, $t_3$ may be received at $t_1+T_2$, $t_2+T_2$, $t_3+T_2$ respectively. The computer 110 may determine that the times $t_1+T_2$, $t_2+T_2$, etc., deviate from expected reception times $t_1+T$, $t_2+T$, etc., which are based on the default base reflection pattern. Thus, the computer 110 may falsely detect the dented-out bumper 140 as an object.

Figure 6:
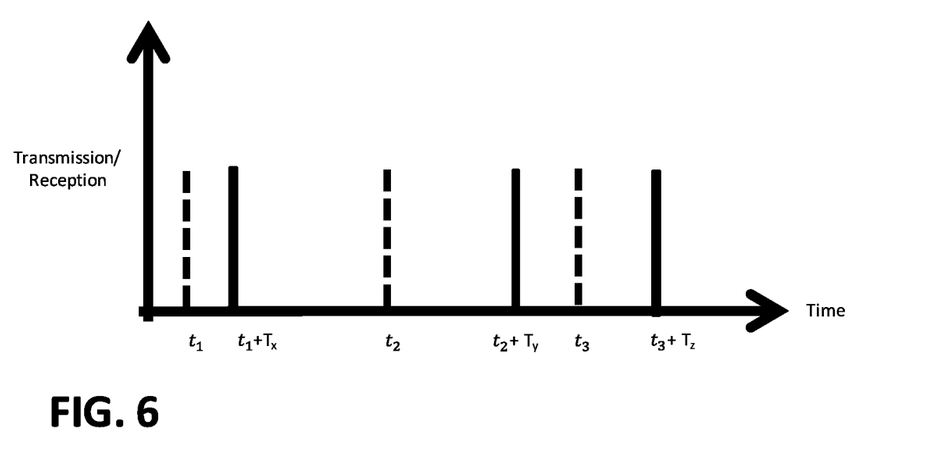
FIG. 6 is an exemplary graph of radar beam echoes from an irregularly dented bumper.

FIG. 6 is an exemplary graph showing the respective times of transmitted and reflected radar sensor 130 beams, where the radar sensor 130 is in a deformed bumper 140 that has an irregular dent. Because the bumper 140 is irregularly dented, a time-to-travel for the transmitted beams may be less than, equal to, or greater than a time-to-travel T for the beams reflected on the non-deformed bumper 140. Therefore, the reflections of the beams transmitted at $t_1$, $t_2$, $t_3$ may be received at $t_1+T_x$, $t_2+T_y$, $t_3+T_z$ respectively. The computer 110 may determine that the times $t_1+T_x$, $t_2+T_y$, etc., deviate from expected reception times $t_1+T$, $t_2+T$, etc., which are based on the default base reflection pattern. Thus, the computer 110 may falsely detect the irregularly dented bumper 140 as an object. Although the times $T_x$, $T_y$, etc., may differ from one another for an irregularly dented bumper 140, depending on deformation shape a pattern may exist among an amount of times $T_x$, $T_y$, etc. For example, the times $T_x$, $T_y$, etc. may be in a certain range, e.g., within a range of 10% less than or greater than a mean value of times $T_x$, $T_y$, etc. For example, the computer 110 may determine an irregular change in the vehicle 100 body 120 based on a determination that a change in time-to-travel is within a range, e.g., 10% greater than or less than a mean value.

Figure 7:
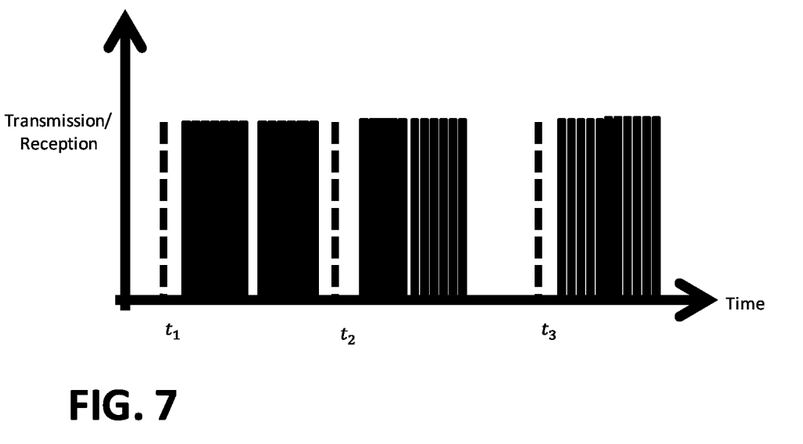
FIG. 7 is an exemplary graph of radar beam echoes from a severely dented bumper.

FIG. 7 is an exemplary graph showing the respective times of transmitted and reflected radar sensor 130 beams, where the radar sensor 130 is in a severely deformed bumper 140. Because the bumper 140 is severely dented, a reflection of a transmitted beam on one area of the bumper 140 may be consequently reflected by other areas of the severely dented bumper 140, and therefore generate multiple reflections. Therefore, time-to-travel of the beams transmitted at $t_1$, $t_2$, $t_3$ may not be determinable. Thus, the computer 110 may determine that there is an object proximate to the bumper 140. Additionally or alternatively, due to reception of various echoes for each of the transmissions, the computer 110 may determine that there is a failure in the radar sensor 130, e.g., if time-to-travel of the received reflections is scattered over a range greater than a threshold such as 30%, i.e., a time-to-travel of the received reflections includes values that are more than 30% greater or less than a mean value of the received reflections.

To avoid a false detection, when a part of the vehicle 100 body 120 is deformed, the computer 110 can be programmed to ignore the deformed part(s), e.g., the bumper 140, of the vehicle 100 body 120 rather than falsely detecting it as an object. For example, the computer 110 receives reflections of beams transmitted by an antenna 150 mounted to the vehicle 100 body 120, and, when it is determined at least based on a vehicle 100 speed that the vehicle 100 is moving, the computer 110 determines whether the vehicle 100 body 120 has changed shape based on the received reflections and a predetermined base reflection pattern. The computer 110 then generates a second base reflection pattern based at least on the received reflections and the predetermined base reflection pattern. The computer 110 may then use the received reflections of the transmitted beams as vehicle 100 sensor data, e.g., for collision avoidance. In one example, the computer 110 may adjust the data included in the default base reflection pattern to generate the second base reflection pattern. For example, a time-to-travel T included in the default base reflection pattern associated with a distance between the radar sensor 130 and the bumper 140 may be changed to $T_1$ based on the received reflection from the deformed bumper 140. Depending on a severity of deformation, the computer 110 may or may not be able to generate a second base reflection pattern. For example, the computer 110 may generate the second reflection pattern for example deformations discussed with reference to FIGS. 5-6, whereas the computer 110 may fail to generate a second base reflection pattern for, e.g., a severely dented bumper 140 discussed with reference to FIG. 7.

To avoid falsely determining that a part of the vehicle 100 body 120 has changed due to a presence of an object such as a pillar, a guard rail, etc., proximate to the vehicle 100, the computer 110 determines whether the vehicle 100 body 120 has changed shape based on the received reflections and a predetermined base reflection pattern when the vehicle 100 is moving. When the vehicle 100 is moving, time-to-travel of the transmitted beams to objects around the vehicle 100 such as guard rail, other vehicles, pedestrians, etc., changes over time. For example, a distance to another vehicle on a road changes. Accordingly, a time-to-travel to other vehicle changes. In contrast, a change in shape of a part such as the bumper 140 of the vehicle 100 body 120 may cause deviations from the base reflection pattern which do not change over time (unless further deformation is applied to the vehicle 100 body 120).

Determining whether the vehicle 100 is moving can be done in various ways. In one example, the computer 110 may be programmed to determine whether the vehicle 100 is moving by determining that a time interval of continuous vehicle 100 movement exceeds a predetermined time duration threshold and a speed of the vehicle 100 is greater than a minimum speed threshold during the entire time interval. As another example, the computer 110 may determine that the vehicle 100 is moving when the vehicle 100 speed exceeds a predetermined threshold. In yet another example, the computer 110 may be programmed to determine whether the vehicle 100 is moving based on data from vehicle 100 sensors such as a vehicle 100 camera, a GPS sensor, a speed sensor, etc. Additionally or alternatively, to avoid falsely determining that a part of the vehicle 100 body 120 has changed due to a presence of an object, the computer 110 may determine whether a vehicle 100 environment is changing, e.g., based on data received from vehicle 100 camera sensors.

To determine whether the vehicle 100 body 120 has changed, the computer 110 may determine an expected reflection of the transmitted beams from the vehicle 100 body 120 based on the predetermined base reflection pattern, e.g., by determining an expected time-to-travel to the bumper 140 in a specific direction such as a direction defined by a longitudinal axis of the vehicle 100. The computer 110 may then determine whether a reflection received from the vehicle 100 body 120 is different from the expected reflection, e.g., having a time-to-travel different from the expected time-to-travel, and the received reflection from the vehicle 100 body 120 is unchanged for at least a predetermined time threshold.

In another example, after determining a change in a bumper 140 shape, the computer 110 may further determine whether a vehicle 100 bumper 140 has a dent-in, a dent-out, and/or an irregular dent, e.g., based on a time-to-travel to the deformed bumper 140 and the base reflection pattern. For example, as discussed with reference to FIG. 4, a time-to-travel $T_1$ less than an expected time-to-travel T based on the base reflection pattern may indicate the bumper 140 is dented inward, i.e., the bumper 140 has a dent-in. The computer 110 may then output a message including data indicating that one or more parts of the vehicle 100 body 120 have changed. For example, the data may indicate a position, e.g., rear bumper 140, of deformation and, a type of deformation such as dent-in, dent-out, etc.

As discussed above, the computer 110 can be programmed to generate a second base reflection pattern after determining that the vehicle 100 body 120 has changed. Thus, based on the second base reflection pattern and the received reflections, the computer 110 can detect objects in a field of view of the antenna 150 and/or prevent a detection of the vehicle 100 body 120 that has changed shape, e.g., a deformed bumper 140, as an object.

Processes

Figure 8A:
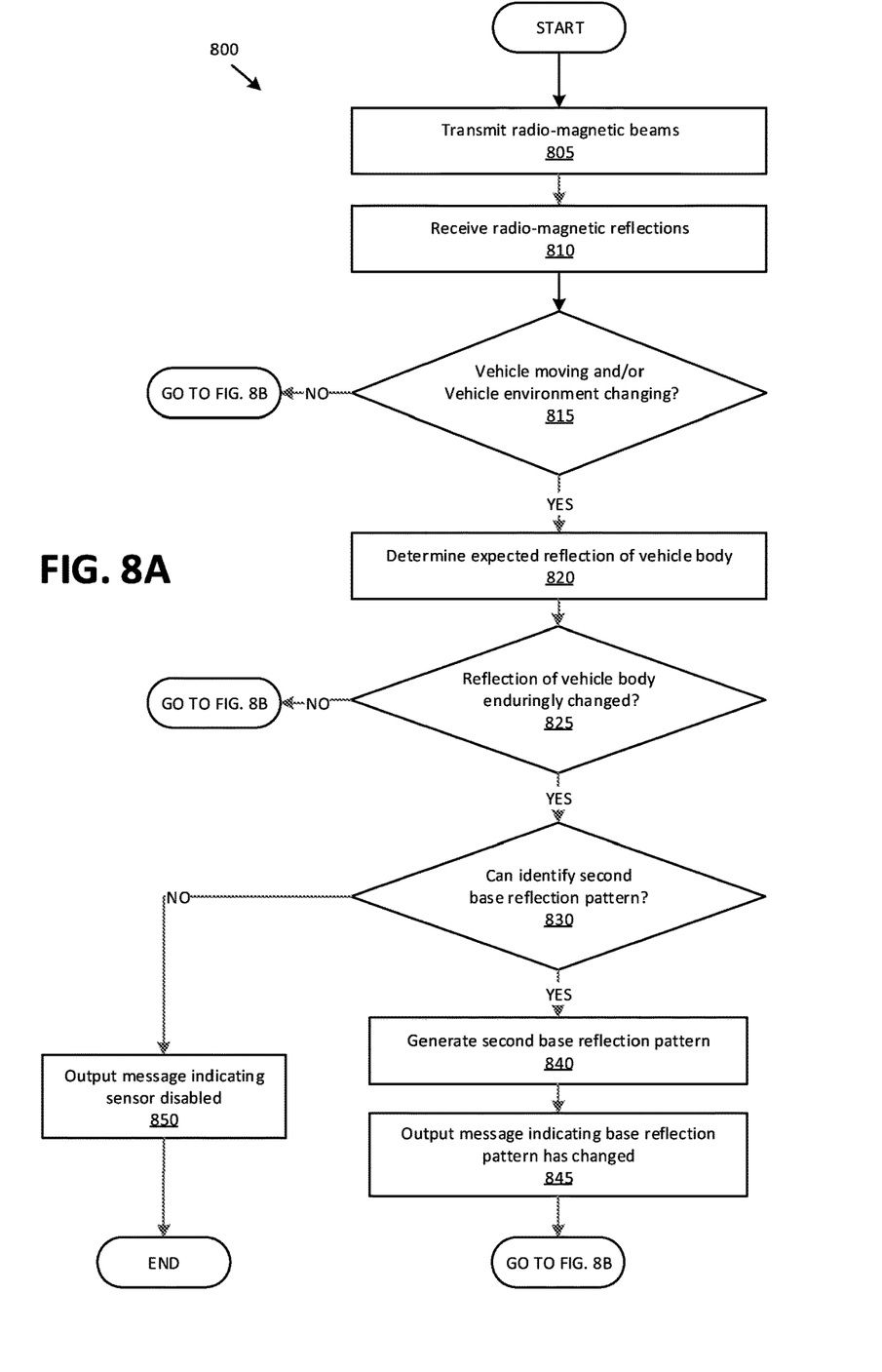
FIGS. 8A-8B are a flowchart of an exemplary process for recalibrating and using for vehicle operation, a radar after a shape of vehicle body has changed.
Figure 8B:
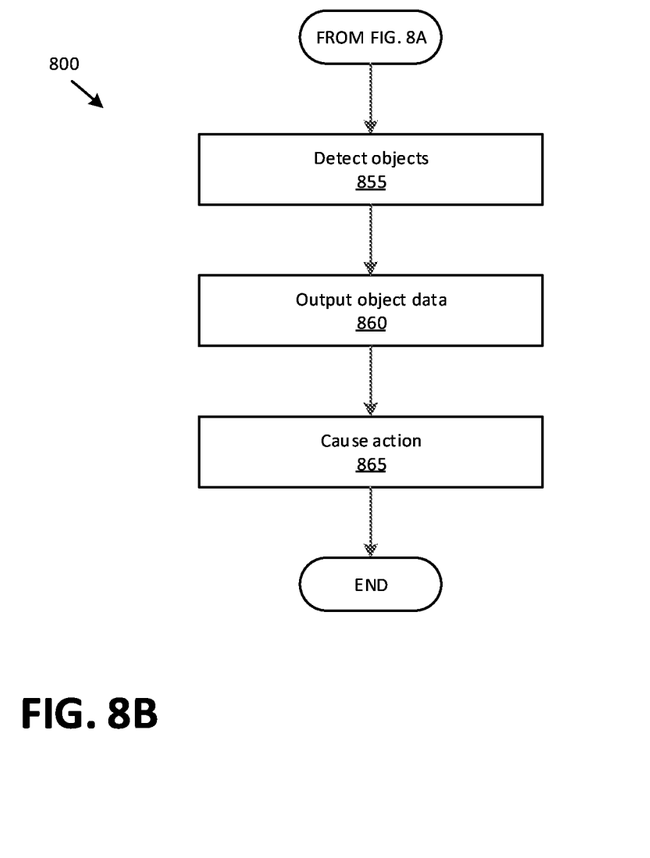

FIGS. 8A and 8B illustrate an exemplary process 800 for recalibrating a radar after a shape of a part, e.g., a bumper 140, of the vehicle 100 body 120 has changed and for operating a vehicle 100 based on object detection data from a recalibrated radar sensor 130. A vehicle 100 computer 110 may be programmed to execute blocks of the process 800 as described below.

The process 800 begins in a block 805, in which the computer 110 actuates transmission of a radio-magnetic beam from an antenna 150 of the vehicle 100 radar sensor 130. For example, the computer 110 generates an instruction or instructions for a radio-magnetic beam to be emitted including a digital signal representing the emission as well as attributes thereof, e.g., specifying a time $t_1$, $t_2$, etc., of a radiation emission (see FIGS. 3-7), and/or other attributes, e.g., a direction, of the beam. Digital signals included in such instructions are then converted to analog signals by a digital-to-analog converter 170 circuit and are boosted by an amplifier circuit 180. The amplified analog signals may then cause a radio-magnetic radiation from the antenna 150 of the radar sensor 130. As discussed above, the radar sensor 130 may include multiple antennas 150 oriented in various directions to, e.g., measure time-to-travel in an area covered by the field of view of the radar sensor 130. In one example, the instruction generated by the computer 110 may specify a particular antenna 150 to radiate the beam. Thus, the computer 110 may sweep a field of view of the radar sensor 130 by transmitting beams in various directions.

Next, in a block 810, the computer 110 receives and detects radio-magnetic reflections of the transmitted beams. For example, the reflections may be received by the antenna (s) 150 of the radar sensor 130, thereby generating analog signals. An amplifier circuit 180 may then boost the received analog signals. The analog-to-digital converter 160 converts the boosted analog signal to digital signals. The computer 110 then receives the digital signals corresponding to the received radio-magnetic reflections.

As discussed above, the radar sensor 130 may include multiple antennas 150 directed in various directions. In one example, the digital signal received by the computer 110 may include data indicating from which one of the antennas 150 the reflection was received. The computer 110 may then determine a direction of the received reflection based on the data received and other data, e.g., computer 110 configuration data, indicating a direction of each of the antennas 150 connected to the radar sensor 130. Additionally, the computer 110 may be programmed to filter received radio-magnetic radiations to remove data that are not associated with the beams transmitted by the vehicle 100 radar sensor 130. For example, the received radio magnetic beams from other transmitters in an area proximate to the vehicle 100, e.g., transmitted beams from antennas 150 of other vehicles sensors, may be ignored. In one example, the computer 110 may be programmed to ignore received radio magnetic radiations that have a frequency different from the frequency of the transmitted beams. As another example, the radar sensor 130 may include a radio-frequency filter circuit, such as is known, which is designed to let the received reflections of the transmitted beams pass through to the computer 110, whereas ignores, i.e., filters out, other received radio-magnetic beams.

Next, in a decision block 815, the computer 110 determines whether the vehicle 100 is moving, e.g., based on vehicle 100 speed, and/or whether a vehicle 100 environment is changing, e.g., based on vehicle 100 sensors such as a camera sensor providing data to determine that the vehicle 100 is moving past objects (e.g., painted lines, signs, etc.) on a roadway. If the computer 110 determines that the vehicle 100 is moving and/or a vehicle 100 environment is changing, then the process 800 proceeds to a block 820; otherwise the process 800 proceeds to a block 855 (see FIG. 8B).

In the block 820, the computer 110 determines an expected reflection of the vehicle 100 body 120. For example, the computer 110 may determine a time-to-travel to the vehicle 100 100 body 120 for a transmitted beam based on the default base reflection pattern. Additionally, when the radar sensor 130 includes multiple antennas 150, then the computer 110 may determine a time-to-travel associated with each of the antennas 150, e.g., a time-to-travel to the bumper 140 in a direction of the vehicle 100 longitudinal axis.

Next, in a block 825, the computer 110 determines whether reflections expected from the vehicle 100 body 120 or a parts of the body 120 such as a bumper 140 have enduringly changed. In one example, the computer 110 may be programmed to identify reflections received from the vehicle 100 body 120 based on a reflection with a time-to-travel that is less than a predetermined time threshold. "Enduringly changed" means that a deviation from the expected reflections remains unchanged over a predetermined period of time. For example, to determine whether the reflections of the vehicle 100 body 120 have changed enduringly, the computer 110 may be programmed to determine whether a deviation from the expected reflection is unchanged during a predetermined time interval, e.g., 5 minutes. If the computer 110 determines that the reflections of the vehicle 100 body 120 have changed enduringly, the process 800 proceeds to a decision block 830; otherwise the process 800 proceeds to the block 855 (see FIG. 8B). In another example, the computer 110 may be programmed to calculate a confidence level, e.g., a percentage value, associated with the change in the received reflections. For example, the computer 110 may increase a confidence level based on successive detection of a change in the vehicle 100 body 120. Thus, after an initial detection of a change in the received reflections, the computer 110 may associate a low confidence, e.g., 10%, to the detected change. With successive determinations that the change in the received reflections has "endured", the computer 110 may increase the confidence level. In one example, the computer 110 may determine that the vehicle 100 body 120 has enduringly changed when the confidence level exceeds a predetermined confidence threshold, e.g., 80%. Additionally, the computer 110 may calculate a noise ratio, e.g., time-to-travel noise level divided by the time-to-travel value, based on measured noise ratio of a non-deformed vehicle 100 body 120. Thus, the noise ratio of the received reflections can be modeled and subsequently used for calculating the confidence level. For example, the computer 110 may be further programmed to calculate the confidence level of a change in the vehicle 100 body 120 based on a change in the noise ratio of, e.g., time-to-travel of, the received reflections. In other words, based on the noise ration of the received reflections, the computer 110 may determine a change in the received reflections as noise, i.e., not an indicator of a deformation of the vehicle 100 body 120.

In the decision block 830, the computer 110 determines whether a second base reflection pattern can be identified. For example, as discussed with reference to FIGS. 4-6, the computer 110 may be programmed to determine a second base reflection pattern when the bumper 140 has a dent-in, dent-out, or an irregular dent. In contrast, as discussed with reference to FIG. 7, the computer 110 may fail to identify a second base reflection pattern when a vehicle 100 body 120 part such as the bumper 140 is severely dented. If the computer 110 determines that a second reflection pattern can be identified, then the process 800 proceeds to a block 840; otherwise, the process 800 proceeds to a block 850.

In the block 850, the computer 110 outputs a message indicating that the radar sensor 130 and/or operations using the radar sensor 130 are disabled. For example, the computer 110 may output a message indicating that a collision avoidance operation of the vehicle 100 is disabled. The message may be outputted to a vehicle 100 display and/or a remote computer such as a computer of a fleet management company.

In the block 840, the computer 110 generates a second base reflection pattern based on the received reflections from the vehicle 100 body 120. The computer 110 may be additionally programmed to identify the received reflections from the vehicle 100 body 120, i.e., distinguishing them from reflections received from other objects such as cars.

Next, in a block 845, the computer 110 outputs a message based on the change in the base reflection pattern. For example, the computer 110 may output the message on a display of the vehicle 100 and/or transmit the message to a remote computer of a fleet management company managing the vehicle 100. The message may include a notification that a sensor 130 requires recalibration and/or inspection, and or data such as a type of deformation, e.g., dent-in, a location of deformation, e.g., a rear bumper 140, and/or information indicating that the radar sensor 130 is fully operational after recalibrating of a base reflection pattern. As discussed below, the computer 110 may be programmed to detect objects based on the generated second base reflection pattern, even though a deformation to the vehicle 100 body 120 has changed the base reflection pattern of the vehicle 100 body 120.

Turning to FIG. 8B, in the block 855, the computer 110 detects objects in the field of view of the radar sensor 130 based on the received reflections and a current base reflection pattern. The current base reflection pattern refers to a most up-to-date base reflection pattern, e.g., the current base reflection pattern can be the default base reflection pattern if no deformation of the vehicle 100 body 120 has been detected. The current base reflection pattern can be a second base reflection pattern if the vehicle 100 body 120 has changed shape and the second base reflection pattern has been generated as described above.

Next, in a block 860, the computer 110 outputs object data, e.g., size of an object, a location of the object relative to the vehicle 100, and/or a type of the object such as vehicle, road structure, pedestrian, etc.

Next, in a block 865, the computer 110 causes one or actions based at least on the object data received from the radar sensor 130. For example, the computer 110 may actuate a vehicle 100 brake based on the object data received from the vehicle 100 radar sensor 130, e.g., by outputting a brake pressure value such as 100 bar to the vehicle 100 brake actuator when a distance between the vehicle 100 and a location of the detected object is less than a minimum distance threshold.

Following the block 865, the process 800 ends, or returns to the block 805, although not shown in the process 800.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor such that the computer is programmed to:
   receive reflections of radio-magnetic beams transmitted by an antenna mounted to a vehicle body, and, when it is determined from vehicle camera data that an area proximate to the vehicle is changing, determine that the-received reflections of the vehicle body have changed based on a predetermined base reflection pattern;
   generate a second base reflection pattern based at least on the received reflections and the predetermined base reflection pattern; and
   then use the received reflections as vehicle sensor data.

2. The computer of claim 1, wherein the antenna is mounted between an exterior surface of the vehicle body and a bumper mounted to the exterior surface.

3. The computer of claim 2, wherein the predetermined base reflection is defined based on a shape of the bumper, a material of which the bumper is formed, a distance of the bumper from the antenna, a shape of the antenna, and a frequency of transmitted radio-magnetic beams.

4. The computer of claim 1, wherein the computer is further programmed to use the received reflections as the vehicle sensor data by detecting one or more objects in a field of view of the antenna based on the received reflections, wherein a detection of a vehicle element as an object is prevented based at least on the predetermined base reflection pattern.

5. The computer of claim 1, wherein the computer is further programmed to use the received reflections as the vehicle sensor data by detecting one or more objects in a field of view of the antenna based on the received reflections, wherein a detection of the vehicle body that has changed shape as an object is prevented based at least on the generated second base reflection pattern.

6. The computer of claim 1, wherein the computer is programmed to determine whether the vehicle body has changed shape by at least:
   determining an expected reflection of the transmitted radio-magnetic beams from the vehicle body including a vehicle bumper based at least on the predetermined base reflection pattern; and
   determining whether a reflection received from the vehicle body is different from the expected reflection and the received reflection from the vehicle body is unchanged for at least a predetermined time threshold.

7. The computer of claim 6, further programmed to determine whether the reflection is received from the vehicle body based at least on a distance of vehicle body elements from the antenna.

8. The computer of claim 1, wherein determining whether the vehicle body has changed shape further includes determining whether a vehicle bumper has one of a dent-in, a dent-out, and an irregular dent.

9. The computer of claim 8, wherein determining whether the vehicle bumper has one of the dent-in, the dent-out, and the irregular dent based on a time of travel of the received reflections.

10. The computer of claim 1, wherein the computer is programmed to determine whether the vehicle body has changed shape by at least:
    determining an expected reflection of the transmitted radio-magnetic beams from the vehicle body including a vehicle bumper based at least on the predetermined base reflection pattern; and
    determining whether a confidence level associated with a change of the vehicle body is greater than a confidence threshold.

11. The computer of claim 1, wherein the computer is programmed to determine whether the vehicle is moving by determining that a time interval of continuous vehicle movement exceeds a predetermined time duration threshold and a speed of the vehicle is greater than a minimum speed threshold during the time interval.

12. The computer of claim 1, wherein one or more additional antennas are mounted to, and directed in a plurality of directions away from, the vehicle body, wherein the computer is programmed to receive reflections of radio magnetic beams transmitted by the one or more additional antennas.

13. The computer of claim 1, further comprising a radio-magnetic amplifier, a digital to analog converter, and an analog to digital converter electrically coupled to the antenna.

14. A method, comprising:
receiving, in a computer, reflections of radio-magnetic beams transmitted by an antenna mounted to a vehicle body;
when it is determined from vehicle camera data that an area proximate to the vehicle is changing, determining that the-received reflections of the vehicle body have changed based on a predetermined base reflection pattern;
generating a second base reflection pattern based at least on the received reflections and the predetermined base reflection pattern; and
then using the received reflections as vehicle sensor data.

15. The method of claim 14, wherein using received reflections as vehicle sensor data further includes:
detecting one or more objects in a field of view of the antenna based on the received reflections, wherein a detection of a vehicle element as an object is prevented based at least on the predetermined base reflection pattern; and
causing an action based on the detected one or more objects.

16. The method of claim 14, wherein using received reflections as vehicle sensor data further includes detecting one or more objects in a field of view of the antenna based on the received reflections, wherein a detection of a vehicle element as an object is prevented based at least on the predetermined base reflection pattern.

17. The method of claim 14, wherein using received reflections as vehicle sensor data further includes detecting one or more objects in a field of view of the antenna based on the received reflections, wherein a detection of the vehicle body that has changed shape as an object is prevented based at least on the generated second base reflection pattern.

18. The method of claim 14, wherein determining whether the vehicle body has changed shape further includes:
determining an expected reflection of the transmitted radio-magnetic beams from the vehicle body including a vehicle bumper based at least on the predetermined base reflection pattern; and
determining whether a reflection received from the vehicle body is different from the expected reflection and the received reflection from the vehicle body is unchanged for at least a predetermined time threshold.

19. The method of claim 14, wherein determining whether the vehicle body has changed shape further includes determining whether a vehicle bumper has one of a dent-in, a dent-out, and an irregular dent.

* * * * *